Aug. 18, 1959 K. G. HUNTLEY 2,900,441

GENERATION OF COLOUR TELEVISION SIGNALS

Filed March 29, 1955 2 Sheets-Sheet 1

INVENTOR
K. G. HUNTLEY
BY Glascock Downing & Seebold
ATTORNEYS

GENERATION OF COLOUR TELEVISION SIGNALS

Filed March 29, 1955 2 Sheets-Sheet 2

INVENTOR
K. G. HUNTLEY
BY Glascock Downing & Seebold
ATTORNEYS

United States Patent Office 2,900,441

Patented Aug. 18, 1959

2,900,441

GENERATION OF COLOUR TELEVISION SIGNALS

Keith Gordon Huntley, Dukeswood, Gerrards Cross, England, assignor to Electric & Musical Industries Limited, Hayes, Middlesex, England, a company of Great Britain Application March 29, 1955, Serial No. 497,618

Claims priority, application Great Britain April 3, 1954

7 Claims. (Cl. 178—5.4)

Figure 1:
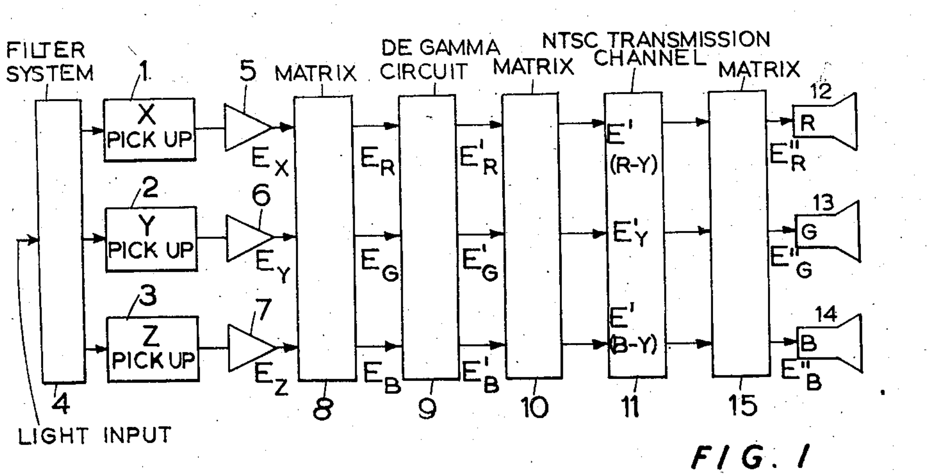

This invention relates to the generation of colour television signals.

It has been proposed to generate colour television signals by employing a camera having three pick-up tubes to which the incident light is distributed in accordance with its colour so that signal outputs can be derived representing different primary colours of the scene being televised. These signal outputs may be, thereafter, converted to a luminance signal and two chrominance signals, the luminance nad chrominance signals being for example combined to produce a waveform in accordance with the N.T.S.C. specification. In general the resolution of the eye is less for chrominance changes than luminance changes and for this reason a smaller band width can be used for the chrominance channels than for the luminance channel.

The main object of the present invention is to provide an improved method of and apparatus for generating colour television signals especially with a view to obtaining an improved signal-to-noise ratio when the incident light is insufficient to saturate the pick-up channels.

According to the present invention there is provided apparatus for generating colour television signals comprising a plurailty of pick-up channels and filter means for distributing incident light to said channels, said filter means having transmittances to the different channels in overlapping spectral bands and the channels being responsive to the distributing light to produce electrical signals representing predetermined primary colours of the incident light, the transmittances of light filters being predetermined in conjunction with the sensitivities of the pick-up channels to produce overall spectral responses of the different pick-up channels which, as functions of frequency, are at least approximately linearly related to the tristimulus values for the equal energy spectrum of said primary colours, and the transmittances of the filter means in conjunction with the sensitivities of the pick-up channels being further predetermined to cause the ratio of the responses of a selected channel to that of each other channel to be substantially greater than the ratio of corresponding primary colour co-ordinates of a light stimulus of mixed colours, to reduce the apparent effect of noise on reproduced pictures when there is insufficient light to saturate the pick-up channels.

According to a feature of the present invention the overall spectral responses, the different channels, as a function of wave length, are at least approximately proportional to the tristimulus values for the equal energy spectrum of the XYZ primary colours, so that the signals produced by the pick-up channels represent respectively the XYZ colour co-ordinates of incident light.

According to another feature of the invention the light distribution is effected by means of dichroic mirrors in which substantially no loss of light occurs, and to give the channels desired spectral responses a further filter is provided for filtering the incident light before the dichroic mirrors.

In order that the invention may be clearly understood and readily carried into effect, the invention will be described with reference to the accompanying drawings.

Figure 2:
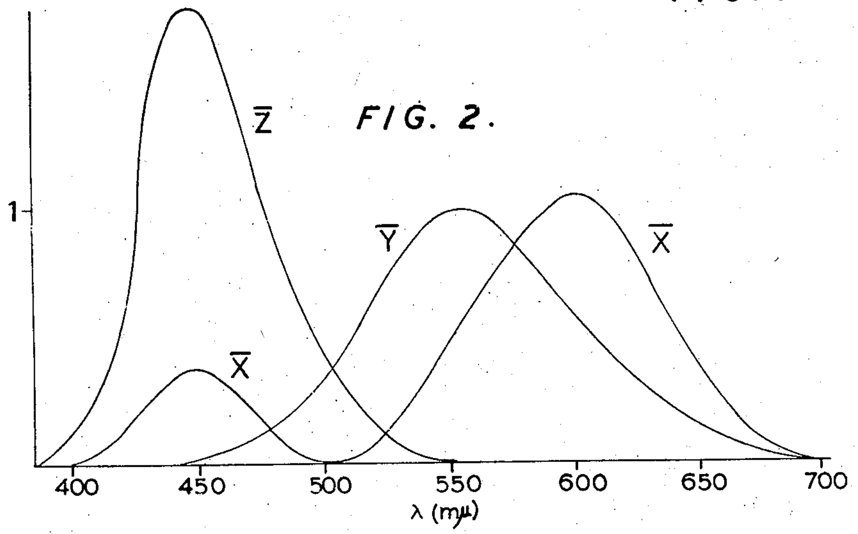
Figure 5:
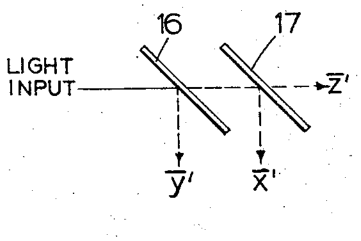
Figure 6:
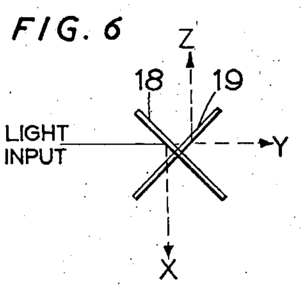
Figure 3:
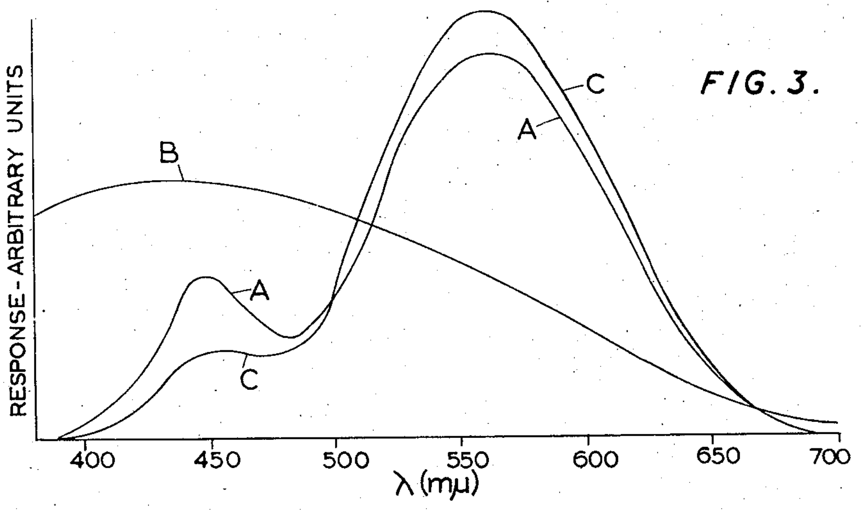
Figure 4:
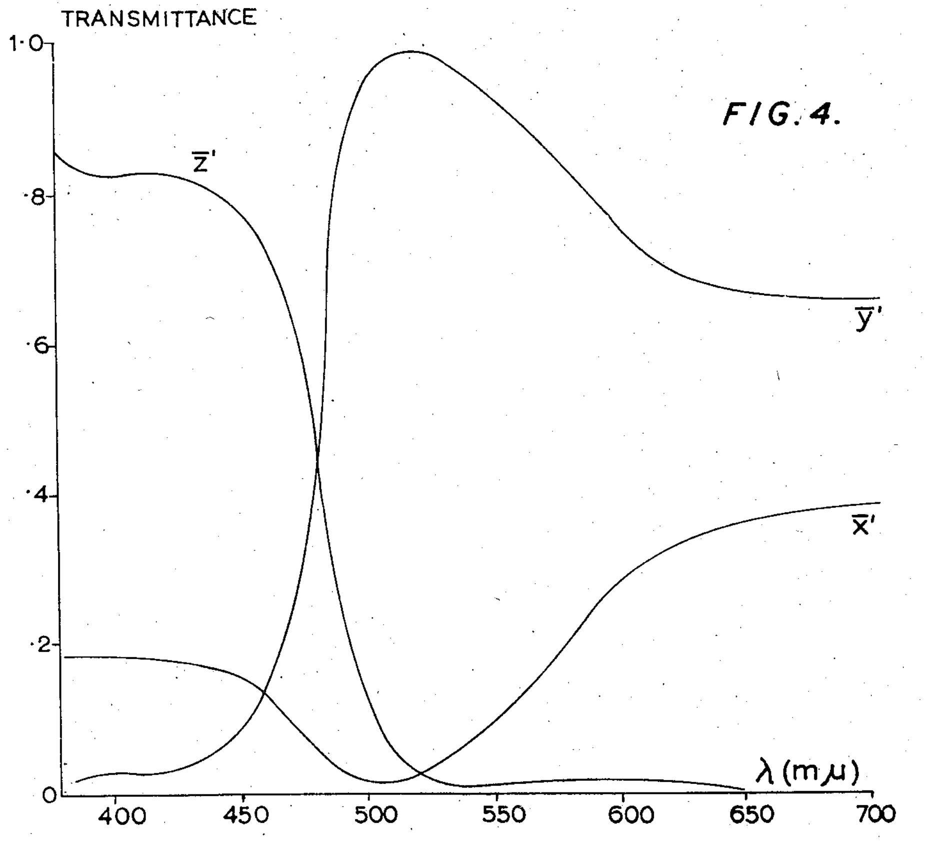

Figure 1 is a block diagrammatic illustration of a colour television channel in accordance with one example of the invention, Figure 2 comprises graphs of the tristimulus values of the primary colours used in the apparatus illustrated in Figure 1, Figure 3 illustrates practical and idealised pick-up tube spectral response characteristics, Figure 4 illustrates camera filter transmittances, Figure 5 illustrates one filter arrangement for realising the transmittances of Figure 4, and Figure 6 illustrates a modification of Figure 5.

Referring to the drawings, in the colour television channel illustrated in Figure 1, the camera is assumed to use the XYZ colour co-ordinates proposed by the C.I.E. in 1931. The channel comprises three pick-up tubes 1, 2 and 3 and the light input from the scene to be televised is divided among the pick-up tubes by a filter system represented diagrammatically by the block 4 and which will be described in more detail later. The signal outputs of the pick-up tubes are applied to head amplifiers 5, 6 and 7 of adjustable gain and thence to a matrix 8 which is arranged to convert the amplified XYZ signals from the pick-up tubes into signals corresponding to the red, green and blue primaries hereinafter denoted by R, G and B of the N.T.S.C. Color Television System. Three signal outputs denoted respectively by $E_R$, $E_G$ and $E_B$ are derived from the matrix, these signal outputs being respectively proportional to the R, G and B components of the scene being televised. These outputs are then applied to a non-linear or so called degamma circuit 9 which is adapted to compensate for the curved response characteristic of the reproducing tubes of the receiver in known manner. The modified signals, denoted respectively by $E'_R$, $E'_G$ and $E'_B$ are converted by a further matrix 10 into a luminance signal $E'_Y$ and two chrominance signals $E'_{R-Y}$ and $E'_{B-Y}$ in accordance with the N.T.S.C. specification. The luminance and chrominance signals are then transmitted by a N.T.S.C. transmission channel 11 to cathode ray image reproducing tubes 12, 13 and 14 adapted to reproduce the R, G and B components of the transmitted signals, the signals being applied to the tubes via a conversion matrix 15 which converts the received N.T.S.C. signals into the proper colour component signals. The gains of the head amplifiers 5, 6 and 7 and the various matrices shown in the apparatus are arranged so that for standard white light (that is light having an equal energy spectral distribution) $E_X$, $E_Y$, $E_Z$, $E_R$, $E_G$, $E_B$ are equal.

Assume that the spectral responses of the camera (i.e. the pick-up tubes 1, 2 and 3 respectively and the filter system 4) are $\bar{F}_i(\lambda)$, $\bar{F}_j(\lambda)$ and $\bar{F}_k(\lambda)$ respectively. Then the pick-up tube outputs are $$I_X=\int_{\lambda=380}^{\lambda=700}\bar{F}_{i}.{}_{E}d\lambda$$

$$I_Y=\int_{\lambda=380}^{\lambda=700}\bar{F}_{j}.\bar{F}_{E}d\lambda$$

$$I_Z=\int_{\lambda=380}^{\lambda=700}\bar{F}_{k}.\bar{F}_{E}d\lambda$$

where $\bar{F}_E(\lambda)$ is the spectral energy distribution of the light source, and $\lambda$ is expressed in millimicrons (m$\mu$).

If the XYZ co-ordinates of the light source are $X_E$, $Y_E$ and $Z_E$ $$\int_{\lambda=380}^{\lambda=700} \overline{F}_E.\overline{X}d\lambda = X_E$$

$$\int_{\lambda=380}^{\lambda=700} \overline{F}_E.\overline{Y}d\lambda = Y_E$$

$$\int_{\lambda=380}^{\lambda=700} \overline{F}_E.\overline{Z}d\lambda = Z_E$$

where the functions $\overline{X}$, $\overline{Y}$ and $\overline{Z}$ are the tristimulus values for the equal energy spectrum for XYZ primary colours, and these functions are represented by the curves in Figure 2. It is a characteristic of the functions $\overline{X}$, $\overline{Y}$ and $\overline{Z}$ that if the light source is a standard white light, $X_E$, $Y_E$ and $Z_E$ are equal.

If the signal currents are proportional to $X_E$, $Y_E$ and $Z_E$, then $$X_E = k_1 I_X,\ Y_E = k_2 I_Y \text{ and } Z_E I_z = k_3$$

therefore $$\int \overline{F}_E \overline{X} d\lambda = X_E = k_1 \int \overline{F}_i . \overline{F}_E d\lambda$$

and similarly for $Y_E$ and $Z_E$. Therefore the overall spectral responses of the camera required to produce signal currents proportional to $X_E$, $Y_E$ and $Z_E$ are given by the equations $$\therefore k_1.\overline{F}_i = \overline{X}$$
$$k_2.\overline{F}_j = \overline{Y}$$
$$k_3.\overline{F}_k = \overline{Z}$$

On the condition that there is unlimited light, so that all three pick-up tubes are able to give maximum signal currents ($I_X$, $I_Y$ and $I_Z$ respectively), the criterion for maximum signal-to-noise ratio is that $I_X = I_Y = I_Z$ for standard white light and thus $k_1 = k_2 = k_3$. This optimum condition arises, because there is a maximum pick-up tube current which cannot be exceeded without overloading the pick-up device. For maximum efficiency no light should be wasted in the filter system, and this condition can be represented by the equation $$\overline{F}_{FX} + \overline{F}_{FY} + \overline{F}_{FZ} = 1$$

where $\overline{F}_{FX}$, $\overline{F}_{FY}$, $\overline{F}_{FZ}$ are the transmittances of the three filters which distribute the light to the pick-up tubes 1, 2 and 3 respectively. If $F_T$ represents the tube spectral sensitivity of the pick-up tubes in the camera, it follows that the ideal pick-up tube spectral sensitivity for each of the tubes 1, 2 and 3 (which assumes that similar tubes are used) is represented by $$F_T = \frac{1}{k_1}(\overline{X} + \overline{Y} + \overline{Z})$$

and with such a spectral sensitivity for the pick-up tubes, the signal-to-noise ratio of the apparatus has its maximum value, on the aforesaid condition that there is unlimited light. Therefore, for unlimited light, the maximum signal-to-noise ratio can be obtained if the overall spectral responses of the different channels, as a function of wave length, are related by the same constant of proportionality to the tristimulus values of the corresponding primary colours for the equal energy spectrum.

However, in practice the condition in which there is only limited light may often be encountered and as will hereinafter appear, the overall spectral responses of the three camera channels is adjusted to yield such a ratio of X, Y and Z signal currents at the outputs of the pick-up tubes that the visual noise at the receiver is a minimum for a given light level. In the case of $I_X = I_Y = I_Z$ (the three signal currents aforesaid) it can be shown that the visual noise levels on the red and blue reproducing tubes, due to noise on the chrominance channels, are of the order of 0.1 and 0.03 respectively of the luminance noise level, bearing in mind that in the N.T.S.C. transmission system, the transmission of all colour information is confined to a relatively small frequency band, say from 0 to 0.5 mc./s., whereas in an intermediate frequency band, say from 0.5 to 1.5 mc./s. information is transmitted in only two channels, the so-called I and Y channels, and at higher frequencies, say up to 4.5 mc./s., information is transmitted only in the Y channel. On the basis that the eye is no more sensitive to changes in chrominance than it is to changes in luminance, the noise on the X and Z channels of the apparatus shown in Figure 1 is increased relative to that on the Y channel by a factor of the order of 5:1, such an increase producing no significant depreciation in picture quality. This is achieved by increasing the relative proportion of light which is transmitted to the Y pick-up tube, that is the pick-up tube 2, thereby to obtain a better performance of the apparatus with limited light. The camera system is therefore operated in such a way that $I_X$, $I_Y$ and $I_Z$ are proportional to $X_E$, $5Y_E$ and $Z_E$ respectively. This result is achieved in accordance with the invention by adjustment of the filter system 4 in relation to the actual pick-up tube sensitivities to give overall responses from the camera channels which are represented by the following equations $$k_1\overline{F}_i = \overline{X},\ k_1\overline{F}_j = 5_1\overline{Y},\ k_1\overline{F}_k = \overline{Z}$$

The overall spectral response for the different channels of the camera, ideally, are still proportional to the tristimulus values of the corresponding primary colours for the equal energy spectrum but in the case of the Y channel the ratio of the spectral response to the corresponding tristimulus value is substantially greater than for the other channels. For any stimulus therefore the ratio of the response of the Y tube to that of either of the other pick-up tubes is substantially greater than the ratio of the corresponding primary colour co-ordinates of the stimulus. For a standard white source the response of the Y tube is in fact of the order of five times that of each of the other tubes though colour co-ordinates are equal, since the tristimulus values of the three colour co-ordinates are equal for the equal energy spectrum. The equality of the signal currents in the transmission channel is restored by relatively adjusting the gains of the amplifiers 5, 6 and 7, as stated above. The desired overall responses from the camera channel can be achieved by a filter system such that the transmittances to the respective pick-up tubes $\overline{x'}$, $\overline{y'}$ and $\overline{z'}$ are in accordance with the following equations $$\overline{F}_{FX} = \frac{\overline{X}}{\overline{X} + 5\overline{Y} + \overline{Z}} = \overline{x}'$$

$$\overline{F}_{FY} = \frac{5\overline{Y}}{\overline{X} \times 5\overline{Y} + \overline{Z}} = \overline{y}'$$

$$\overline{F}_{FZ} = \frac{\overline{Z}}{\overline{X} + 5\overline{Y} + \overline{Z}} = \overline{z}'$$

These transmittances are represented by the curves in Figure 4. The idealised pick-up tube response $\overline{F}_t$ for maximum light efficiency is then $$\frac{1}{k_1}(\overline{X} + 5\overline{Y} + \overline{Z})$$

as a function of wavelength, as represented by the curve A in Figure 3. However, the sensitivity of a practical television pick-up tube, such as a cathode potential stabilised tube, may have a response $\overline{F}'_t$ as represented by the curve B in Figure 3 and to compensate for the difference between this response and the desired response $F_T$ the filter system 4 is provided with an overall filter, which may be termed "tailoring" filter, arranged to apply a "tailoring" function to the filter system given by $$\overline{F}_F = \frac{k(\overline{X} + 5\overline{Y} + \overline{Z})}{\overline{F}_T}$$

The tailoring filter is arranged to filter incident light before it passes to the filters for distributing light to the different channels. One practical form of the filter system is represented in Figure 5 and comprises two dichroic mirrors 16 and 17 arranged in series. The light reflected from the first mirror 16 constitutes the light input to the Y pick-up tubes 2, the light reflected from the mirror 17 is the light input to the X pick-up tube 1, and the light transmitted by the second mirror is the light input to the Z pick-up tube 3. To achieve the transmittances to the pick-up tubes represented by the curves of Figure 4, the reflectances and transmittances of the mirrors 16 and 17 are arranged to be as represented by the equations Reflectance of 16 $=\bar{y}'$ Transmittance of 16 $=(1-\bar{y}')$ Reflectance of 17 $=\frac{X'}{(1-\bar{y}')}$ Transmittance of 17 $=\frac{\bar{z}'}{(1-\bar{y}')}$ The overall "tailoring" filter is not represented in Figure 5. The arrangement shown in Figure 5 has the disadvantage of requiring a long optical path and in the modification shown in Figure 6, the optical path is shortened by using crossed mirrors 18 and 19. In this case the light reflected from 18 and transmitted through 19 is the light input to the X pick-up tube 1, the light transmitted by 18 and 19 is the input to the Y pick-up tube 2, and the light transmitted by 18 and reflected by 19 is the input to the Z pick-up tube 3. This arrangement, as compared with Figure 5 has the disadvantage that there are four outputs and it cannot therefore be made to satisfy the functions $\bar{x}'$ $\bar{y}'$ and $\bar{z}'$. In practice a compromise can be made by designing the mirrors to satisfy two of the transmittance functions, say $y'$ and $z'$, and correcting the resulting $x$ output externally. The filters and mirrors used in the optical system can be manufactured by methods known in the art.

From the curve B in Figure 3 it can be observed that the sensitivity of a practical pick-up tube may be deficient in the yellow-green region. A considerable improvement in the light efficiency of the system may be made by using an illuminant for the scene to be televised which has a large proportion of its radiant energy in the yellow region, thus pre-distorting the colour content of the scene. In this case the overall colour response of the camera channels may be restored by means of the "tailoring" filter with less waste of light energy than would otherwise be the case.

It is preferred, in accordance with the invention, to analyse the incident light in XYZ co-ordinates, since this permits greater accuracy of reproduction when analysing with three real filters. Nevertheless the invention is also applicable where the analysis is effected in other colour co-ordinates, for example the R, G and B co-ordinates of the N.T.S.C. specification. A channel employing the N.T.S.C. co-ordinates may be of generally similar construction to that shown in Figure 1, the matrix 8 of Figure 1 being, however, unnecessary. An analysis similar to that given above for the case of XYZ co-ordinates shows that, with RGB co-ordinates, and if unlimited light is available, the maximum signal-to-noise ratio is obtainable if the overall spectral responses of the different channels are related to the tristimulus values for the corresponding primary colours by the same constant of proportionality, assuming no loss of light in the filter system other than that of the "tailoring" filter used to tailor the actual sensitivities of the pick-up tubes to the ideal. The luminance signal Y is synthesised in the matrix 10 in accordance with the equation $$Y=1.000R_1+1.776G_1+.294B_1$$

With equal pick-up tube currents, the noise contributions from the red, green and blue channels in the luminance signal are then in the ratios $(1.00)^2:(1.776)^2:(0.294)^2$ and evidently therefore the greatest contribution to the noise in the channel is made by the output of the green pick-up tube. Therefore, when analysing in RGB co-ordinates, a substantial improvement in the signal-to-noise ratio of the luminance channel, with limited light, can be obtained by arranging that, at least approximately $$k_2=k_1/(1.776)^{2/3}$$

$$k_3=k_1/(0.294)^{2/3}$$

where $k_1$, $k_2$ and $k_3$ are the constants of proportionality between the overall spectral responses of the camera channels and the corresponding tristimulus values of the primary colours for the equal energy spectrum. The curve C in Figure 3 shows the optimum overall camera response in this case.

The signal pick-up of the camera in the green-yellow region can be increased by increasing the relative or absolute sensitivity of the pick-up tubes in the green-yellow region.

The design and operation of colour television apparatus in accordance with the invention, to give the best signal-to-noise performance with limited light, does not appreciably degrade the performance when unlimited light is available. Different "tailoring" filters may be provided for daylight and for studio use. The employment of a tailoring filter in conjunction with dichroic mirrors in which substantially no light is lost has the advantage that only one element of the filter system need be changed to cope with different pick-up tube spectral sensitivities.

Although the invention has been described as applied to television cameras for deriving signals representative of an actual scene, the invention is not confined thereto and is also applicable to apparatus for deriving television signals from the scanning of film, since shortage of light may also be a problem in such apparatus.

In practice the overall spectral response of the signal pick-up channels for the different colour components, may not be exactly but merely approximately proportional to the tristimulus values of the corresponding colours. Furthermore in a practical form of the invention, the left hand minor lobe in the $\bar{X}$ curve of Figure 2, centered in the vicinity of $\lambda=450$ m$\mu$, may be ignored and suitable compensation provided by adding a proportion of the signal from the Z pick-up tube into the $\bar{X}$ channel. This practical modification requires a corresponding modification of Figure 4.

What I claim is:

1. Apparatus for generating colour television signals comprising three pick-up channels and filter means for distributing incident light to said channels, said filter means having transmittances to the different channels in overlapping spectral bands and the channels being responsive to the distributing light to produce electrical signals representing predetermined primary colours of the incident light, the transmittances of light filters being predetermined in conjunction with the sensitivities of the pick-up channels to produce overall spectral responses of the different pick-up channels which, as functions of frequency, are at least approximately linearly related to the tristimulus values for the equal energy spectrum of said primary colours, and the transmittances of the filter means in conjunction with the sensitivities of the pick-up channels being further predetermined to cause the ratio of the responses of a selected channel to that of each other channel to be substatnially greater than the ratio of corresponding primary colour co-ordinates of a light stimulus of mixed colours, to reduce the apparent effect of noise on reproduced pictures when there is insufficient light to saturate the pick-up channels.

2. Apparatus for generating colour television signals comprising three pick-up channels and filter means for distributing incident light to said channels, said filter means having transmittances to the different channels in overlapping spectral bands and the channels being responsive to the distributed light to produce electrical signals representing red, green and blue primary colours of the incident light, the transmittances of said filter means being predetermined in conjunction with the sensitivity of the pick-up channels to produce overall spectral response of the different pick-up channels which, as functions of frequency, are at least approximately linearly related to the tristimulus values for the equal energy spectrum of said primary colours, and said filter means being further predetermined in conjunction with the sensitivities of the pick-up channels to cause the ratio of the response of the green channel to that of the red or blue channel to be substantially greater than the ratio of the corresponding primary colour co-ordinates of a light stimulus of mixed colours, to reduce the apparent effect of noise in reproduced pictures when there is insufficient light to saturate the pick-up channels.

3. Apparatus for generating colour television signals comprising three pick-up channels and filter means for distributing incident light to said channels, said filter means having transmittances of the different channels in overlapping spectral bands and the channels being responsive to the distributed light to produce electrical signals representing X, Y and Z primary colours of the incident light, the transmittances of said filter means being predetermined in conjunction with the sensitivity of the pick-up channels to produce overall spectral response of the different pick-up channels which, as functions of frequency, are at least approximately linearly related to the tristimulus values for the equal energy spectrum of said primary colours, and said filter means being further predetermined in conjunction with the sensitivities of the pick-up channels to cause the ratio of the response of the Y channel to that of the X or Z channel to be substantially greater than the ratio of the corresponding primary colour co-ordinates of a light stimulus of mixed colours, to reduce the apparent effect of noise in reproduced pictures when there is insufficient light to saturate the pick-up channels.

4. Apparatus according to claim 3, said filter means having transmittances to the X, Y and Z channels approximately in accordance with the formula:

$$\frac{\bar{X}}{\bar{X}+5\bar{Y}+\bar{Z}}$$

$$\frac{5\bar{Y}}{\bar{X}+5\bar{Y}+\bar{Z}}$$

$$\frac{\bar{Z}}{\bar{X}+5\bar{Y}+\bar{Z}}$$

5. Apparatus according to claim 2 wherein the light distribution to the X channel is substantially zero for wavelengths in the vicinity of 450 millimicrons, and comprising means for injecting a fraction of the electrical signal output of the Z channel into the X channel.

6. Apparatus according to claim 1, said filter means comprising dichroic mirrors in which substantially no loss of light occurs and a filter for filtering incident light before the dichroic mirrors to derive desired transmittances for the different channels.

7. Apparatus according to claim 1 comprising illuminating means for the object biassed in favour of the frequency range of the light transmittance to the selected channel.

References Cited in the file of this patent

UNITED STATES PATENTS

| | | |
|---|---|---|
| 2,657,254 | Wintringham | Oct. 27, 1953 |
| 2,657,255 | Wintringham | Oct. 27, 1953 |
| 2,657,256 | Wintringham | Oct. 27, 1953 |
| 2,773,929 | Loughlin | Dec. 11, 1956 |